United States Patent
Chen et al.

(10) Patent No.: US 10,187,289 B1
(45) Date of Patent: Jan. 22, 2019

(54) ROUTE ADVERTISEMENT MANAGEMENT USING TAGS IN DIRECTLY CONNECTED NETWORKS

(71) Applicant: Amazon Technologies, Inc., Seattle, WA (US)

(72) Inventors: Po-Chun Chen, Herndon, VA (US); Mark Edward Stalzer, Arlington, VA (US); Marco Eulenfeld, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 14/981,677

(22) Filed: Dec. 28, 2015

(51) Int. Cl.
*H04L 12/751* (2013.01)
*H04L 12/66* (2006.01)

(52) U.S. Cl.
CPC .............. *H04L 45/02* (2013.01); *H04L 12/66* (2013.01)

(58) Field of Classification Search
CPC ................................ H04L 45/02; H04L 12/66
See application file for complete search history.

(56) References Cited

U.S. PATENT DOCUMENTS

| | | | | |
|---|---|---|---|---|
| 9,692,692 | B1 * | 6/2017 | Vairavakkalai | H04L 45/50 |
| 2007/0086429 | A1 * | 4/2007 | Lawrence | H04L 45/04 370/351 |
| 2008/0062891 | A1 * | 3/2008 | Van der Merwe | H04L 45/04 370/254 |
| 2013/0136138 | A1 * | 5/2013 | Miller | H04L 67/14 370/395.53 |

OTHER PUBLICATIONS

"As7018|One Step", Retrieved from URL: http://onestep.net/communities/as7018/ on Dec. 1, 2015, pp. 1-4.
Cisco, "BGP Case Studies", Retrieved from URL: http://www.cisco.com/c/en/us/support/docs/ip/bordergatewayprotocolbgp/26634bgptoc.html#communityattribute on Dec. 1, 2015, pp. 1-71.
"Network 101: BGP Community attribute", Retrieved from URL: http://network101.blogspot.com/2011/01/bgpcommunityattribute.html on Dec. 1, 2015, pp. 1-5.

* cited by examiner

*Primary Examiner* — Ricky Q Ngo
*Assistant Examiner* — Stephen N Steiner
(74) *Attorney, Agent, or Firm* — Robert C. Kowert; Meyertons, Hood, Kivlin, Kowert & Goetzel, P.C.

(57) ABSTRACT

A system includes a provider network and a client network connected via a dedicated physical connection. The client network and the provider network exchange routing information using routing protocol messages, such as border gateway protocol (BGP) update messages exchanged during a BGP session. A provider network includes tag field values in outgoing routing protocol messages that indicate a portion of the provider network wherein resources of the provider network associated with a corresponding route are located. The client network may use the tag field value to determine whether to add the route to a routing table of the client network. A client network may also include tag field values in outgoing routing protocol messages to a provider network. The tag field values may indicate what portions of the provider network are to receive the routes from the client network. For example a tag field value may indicate that a route is to be propagated within a limited portion of the provider network.

20 Claims, 10 Drawing Sheets

*Routing Protocol Message from Provider Network*

| Header Type=2  202 | Update Message  204 |
|---|---|
| ⋮ | ⋮ |
| Path Attributes: | XXXX: YYYY (Local Region)<br>XXXX: ZZZZ (Local Area)  208 |
| Network Layer Reachability Info: (NLRI) | AAA . AA . AA/AA<br>BBB . BB . BB/BB  212 |

*FIG. 2A*

*Routing Protocol Message from Client Network*

| Header Type=2  214 | Update Message  216 |
|---|---|
| ⋮ | ⋮ |
| Path Attributes: | XXXX: WWWW (Local Region)<br>XXXX: VVVV (Local Area)<br>(No Tag)  220 |
| Network layer Reachability Info: (NLRI) | CCC . CC. CC/CC<br>DDD . DD. DD/DD<br>EEE . EE. EE/EE  222 |

*FIG. 2B*

ROUTE ADVERTISEMENT MANAGEMENT USING TAGS IN DIRECTLY CONNECTED NETWORKS

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers. In many cases providers set up large networks that may logically span several regions, countries, or even continents, and may include numerous data centers with varying levels of services and facilities available, utilized together, to provide a unified set of services to their end customers.

In some data centers that have been set up to provide computing and/or storage facilities to remote clients, a set of computational resources at the data center may be dynamically divided into resource pools, with each pool being made available for exclusive use by a given client for designated periods of time. There are a number of alternatives available for how the consumers of these facilities establish network connectivity to the resource pools that have been designated for their use. Resources that have been designated for use by a particular consumer may be referred to herein as resources that have been provisioned to a client or customer. Customers may originate requests from a wide variety of devices—desktop personal computers, laptops, client-office servers, tablets, smart phones and the like. These devices may use either long-lasting network links (e.g., using a client office network with a T1 connection) to communicate with their proximate network and/or the public Internet, or they may have transient connectivity (e.g., in the case where the customer uses a mobile smart phone). The proximate networks to which the customer devices are directly connected may in turn route request traffic to the provider network's data centers over a wide variety of paths. Such paths in many cases may have somewhat unpredictable performance, reliability and security characteristics.

For some casual types of service requests, such as a request from a customer to read a recent news article from a web-based news provider, a reasonable variation in responsiveness and an occasional dropped connection may be acceptable. However, for many business-related data transmissions more stringent performance, reliability and security needs may exist. In such environments, a customer of the provider network may need a greater level of network isolation and control than is generally available over the public Internet. For example, the customer may wish to establish, if possible, dedicated physical network links between the customer's own client network and the provider network, such that the only traffic transmitted over those links is traffic generated on behalf of the customer and in accordance with policies established by the customer.

Autonomous systems, such as a customer's client network and a provider network, may exchange routing information with each other according to a routing protocol, such as the border gateway protocol (BGP). Pairs of edge routers in respective autonomous systems may initiate a semi-permanent TCP connection and exchange routing information with each other via messages sent through the semi-permanent TCP connection. A client network or a provider network, may also include semi-permanent TCP connections between pieces of networking equipment within the client network or within the provider network. For example, an edge router on an edge of a provider network may establish a semi-permanent TCP connection with an edge router of a client network and also establish semi-permanent TCP connections with various pieces of networking equipment within the provider network. The edge router of the provider network may receive routing information from the client network via the semi-permanent TCP connection with the edge router of the client network. The edge router of the provider network may propagate the received routing information from the client network to various pieces of networking equipment within the provider network and the various pieces of network equipment may further propagate the received routing information from the client network to other pieces of networking equipment in the provider network to advertise the routing information received from the client network within the provider network. In a similar manner, a client network may propagate routing information received from a provider network within the client network to advertise the routing information received from the provider network within the client network.

In environments in which a customer of a provider network has a dedicated physical connection or cross-network link between the customer's own client network and the provider network, the customer may desire to limit how much of the provider network receives routing information for routes within the customer's client network. For example, a customer may not want to have the customer's client network routing information advertised throughout a whole provider network that spans multiple, regions, countries, or continents.

In addition, a client network receiving address advertisements from a provider network, may desire to include only a portion of advertised routing information of the provider network in a routing table managed by the client network. For example, a customer may not want to include routing information for resources of the provider network that are distant from the customer's client network in a routing table maintained by the client network, or a customer may wish to only include routing information in its routing table that is for a region of the provider network in which the customer has provisioned resources in the provider network.

BRIEF DESCRIPTION OF THE DRAWINGS

FIG. 2A illustrates an example of constituent elements of a routing protocol message from a provider network that includes routing information and tag field values, according to some embodiments.

FIG. 2B illustrates an example of constituent elements of a routing protocol message from a client network that includes routing information and tag field values, according to some embodiments.

Figure 1A:
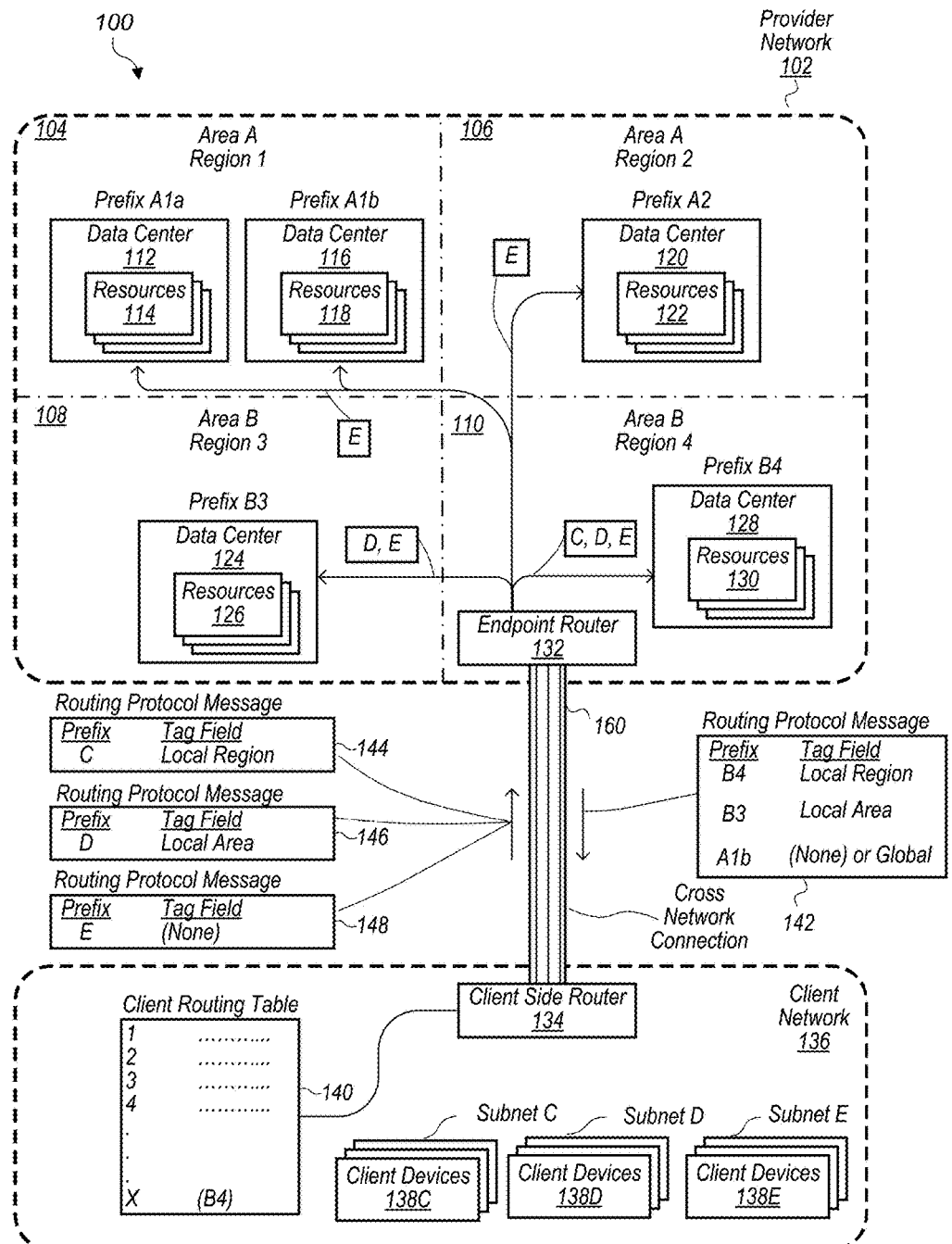
FIG. 1A illustrates a provider network and a client network that are connected via a dedicated physical connection, according some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for using tags, such as border gateway protocol (BGP) community tags, to manage distribution of routing information between customer networks (also referred to herein as "client networks") and provider networks that are connected via a dedicated physical connection are described.

Networks set up by an entity such as a company or a public sector organization to provide one or more services accessible via the Internet (such as various types of cloud-based computing or storage) to a distributed set of clients may be termed provider networks in this document. Such a provider network may include numerous data centers hosting various resource pools, such as collections of computer servers, storage devices, networking equipment and the like, needed to implement and distribute the services offered by the provider.

In order to extend the geographical areas over which its services can be accessed with desired levels of performance, reliability and security, an operator of a provider network may establish dedicated private network paths between its data centers and one or more routers that are physically located at a facility remote from the data centers. Routers owned or managed by, or on behalf of, the provider network operator are called "endpoint" routers in this document, as they may represent the furthest points to which the provider network's control or ownership of network equipment extends. In some embodiments, an endpoint router may be an edge router. For example, only traffic that has passed through a device owned or managed by the provider network operator, and therefore complies with policies set by the provider network operator, may be allowed on the private paths between the endpoint routers or edge routers and other components of the provider network.

An endpoint router of a provider network may be connected to a client-side router of a client network via a private dedicated physical link between the provider network and the client network. These private paths are termed "dedicated physical connections" or "cross-network links" in this document. In contrast to the public internet, dedicated physical connections between a provider network and a client network may be restricted such that only communications between the provider network and client networks are transmitted over these physical links. For example, a dedicated physical connection may include a dedicated fiber optic cable that connects a client network to a provider network and that is not shared with the public. In some embodiments, a dedicated physical connection may only transmit communications between a single client network and a provider network and not be shared with other customers of the provider network. In some embodiments a dedicated physical connection may transmit communications between multiple customers of a provider network and the provider network, but may not be available for use by non-customers.

A provider network and a client network that are connected via a dedicated physical connection may exchange routing information between each other to update routing tables maintained by the provider network and routing tables maintained by the client network. For example, a provider network and a client network connected via a dedicated physical connection may initiate routing protocol sessions, such as BGP sessions, between the provider network and the client network and transmit routing protocol messages, such as BGP update messages, between the networks over the dedicated physical connection. A routing protocol message, such as a BGP update message, from a provider network may include routing information, such as IP address prefixes, for resources of the provider network. In some embodiments, resources of the provider network may be private resources that are assigned private IP addresses and in some embodiments, the resources of the provider network may be public resources that are addressed with public IP addresses. In addition, a client network may provide routing protocol messages, such as BGP update messages, to the provider network, wherein the routing protocol messages from the client network include routes for client devices or resources of the client network. In some embodiments, a routing protocol used to exchange routing information may be the border gateway protocol (BGP), or another suitable routing protocol.

A customer of a provider network may desire that routes for the customer's client network only be shared with a limited portion of the provider network. For example, a customer of a provider network may desire to only have routes for the customer's client network shared with a local region of the provider network but not be shared with other regions of the provider network. As discussed in more detail below in regard to FIGS. 1A and 1B, by altering which portions of a provider network receive routing information for routes of a client network, the client network may be able to cause inter-regional traffic between the client network and the provider network to be transmitted across regions via the client's network or to be transmitted across regions via the provider network.

In order to communicate to the provider network with which portions of the provider network the customer desires its routing information be shared, the customer may use tag field values that conform to a route tagging schema published by the provider network and that are recognizable by the provider network to indicate a portion of the provider network with which the customer desires its routing information be shared. The customer may configure one or more of the customer's pieces of networking equipment, such as a client-side router, to include tag field values in an outgoing routing protocol message based on the customer's preferences for how far into the provider network the customer desires its routing information to be propagated. For example a client-side router on an edge of a client network may be configured to initiate a routing protocol session, such as a BGP session, with an endpoint router of a provider network and include tag field values, such as BGP community tags field values, that each correspond with different routes being advertised in the routing protocol message. The tag field values may indicate to the provider network with which portions of the provider network, the customer desires its routing information to be shared with. Thus by including tag field values in routing protocol messages that correspond to routes included in the routing protocol messages, a client may remotely control how far its routing information is propagated into the provider network. A customer may change how far the customer's routing information is propagated into a provider network by including different tag field values in outgoing routing protocol messages without changing any settings of a client profile associated with the customer and stored by the provider network.

For example, a customer may initially desire to only advertise or propagate the customer's routing information in a local region of a provider network and may subsequently decide to advertise the customer's routing information into a larger portion of the provider network, such as a geographic area that encompasses multiple regions of the provider network. In order to effect this change, a client may reconfigure the client's networking equipment, such as a client-side router, to include a different tag field value in outgoing update messages than a tag field value that was initially included in routing protocol messages and that indicated the desire to only advertise the customer's routing information in the local region. The different tag field values may indicate the customer desires to advertise or propagate the customer's routing information in the larger geographic area of the provider network. In response to receiving routing protocol messages that indicate the different tag field value for respective routes, the provider network may propagate the corresponding routes within the larger geographic area of the provider network without the client having to directly alter any settings of the provider network or a client profile of the customer that is stored by the provider network.

A customer of a provider network, may also desire to only include routing information for a portion of a provider network in a routing table managed by the customer. For example, resources of the provider network may be provisioned to the customer in a local region of the provider network. The customer may desire to include routing information for the local region of the provider network in the customer's routing table but may not desire to include routing information for other regions of the provider network in which the customer does not have provisioned resources. An endpoint router of a provider network may be configured to include tag field values for corresponding address prefixes that are being advertised by the provider network in a routing protocol message sent from the provider network to the customer's client network. A client-side router on an edge of the client network may be configured to only admit address prefixes with one or more particular corresponding tag field values into a routing table managed by the client network. The approved tag field values may correspond with a portion of the provider network for which the customer wants routing information included in the customer's routing tables. For example, a client-side router on an edge of a client network may be configured to only include advertised routes that correspond with a local region of the provider network in a routing table managed by the client network and disregard routes that correspond with other regions of a provider network.

According to one embodiment, a system includes a provider network that includes multiple computing devices configured to implement resources of the provider network. The system also includes an endpoint router of the provider network that is connection to a client network via a dedicated physical connection between the provider network and the client network. One or more of the resources of the provider network may be provisioned to a client of the provider network that operates the client network. At least some networking devices of the provider network may be configured to receive, via the endpoint router of the provider network, a routing protocol message from the client network, wherein the routing protocol message includes one or more respective routes for resources of the client network; and one or more respective tag fields, wherein respective ones of the routes correspond with respective ones of the one or more respective tag fields. At least some of the networking devices of the provider network may also be configured to propagate the one or more respective routes within the provider network based, at least in part, on one or more respective values of the one or more respective tag fields. If a given respective tag field indicates a particular value such as a value that indicates a local routing scope, the one or more networking devices of the provider network may be configured to propagate a respective route that corresponds with the given respective tag field within a limited portion of the provider network that includes the endpoint router and if the given respective tag field indicates a different value, such as a value that indicates a larger routing scope, the one or more networking devices of the provider network may be configured to propagate the respective route that corresponds with the given tag field within a larger portion of the provider network that includes the endpoint router. For example, networking devices of a provider network may propagate a respective route only within a local region of a provider network when a tag field value that corresponds with a route indicates a particular value defined as "local region" and the networking devices of the provider network may propagate the respective route within a larger area of the provider network when the tag field value that corresponds with the route indicates a different particular value defined as "local area." In some embodiments, various portions of a provider network may be indicated by tag field values, such as local region, local area, local continent, global, or some other portion of a provider network.

According to one embodiment a method includes receiving, at an endpoint router of a provider network that is connected to a client network via a dedicated physical connection between the provider network and the client network, one or more routes for resources of the provider network. The method also includes determining according to a route tagging schema published by the provider network and based on an origin location of the one or more routes within the provider network and a local location of the endpoint router, one or more respective tag field values for the one or more routes. The method also includes providing to the client network, via the endpoint router, a routing protocol message, wherein the routing protocol message includes the one or more routes; and the one or more determined respective tag field values indicating one or more respective portions of the provider network where the resources that correspond with the one or more routes are located. The one or more respective tag field values may be formatted to be used by the client network to determine whether to add the one or more respective routes to a routing table maintained by the client network based, at least in part, on the one or more respective portions of the provider network indicated by the one or more respective tag field values. For example a client-side router may be configured to only add routes to a routing table managed by the client network that are in a local region of the provider network that is local to the client network. Tag field values may indicate routes that are in the local region of the provider network and other tag field values may indicate routes that are in a larger area of the provider network but not in the local region of the provider network. The client-side router may add the routes that are indicated to be in the local region of the provider network to the routing table managed by the client network, but may disregard the routes that are outside of the local region of the provider network.

According to one embodiment, a non-transitory computer-accessible storage medium stores program instructions that when executed on one or more processors in response to receiving, at a provider network, a routing protocol message from a client network, wherein the client network is connected to the provider network via a dedicated physical connection, wherein the routing protocol message comprises one or more routes for resources of the client network and one or more respective tag field values that correspond with the one or more routes, propagate the one or more routes within the provider network based, at least in part, on the one or more respective tag field values. Where, the program instructions when executed on the one or more processors in response to a given tag field value indicating a particular value propagate a given corresponding respective route within a limited portion of the provider network; and in response to the given tag field value indicating another value propagate the given corresponding respective route within a larger portion of the provider network. For example the program instruction may cause a provider network to propagate routes such that, if a given tag field value indicates a desire to advertise a corresponding route within a local portion of the provider network, the provider network propagates the given route only within the local portion, and if the given tag field value indicates a desire to advertise the corresponding route within a larger portion of the provider network, the provider network propagates the given route within the larger portion of the provider network.

Example System Environment

FIG. 1A illustrates an example system environment that includes a provider network and a client network that are connected via a dedicated physical connection, according to some embodiments. The system 100 may include a provider network 102 that includes multiple geographic areas and regions. For example provider network 102 includes geographic areas A and B and regions 1, 2, 3, and 4. A region or geographic area of a provider network may include one or more data centers. For example region 1 includes data center 112 and data center 116. Geographic area A includes data centers 112 and 116 in region 1 and includes data center 120 in region 2. Data centers of a provider network, such as data centers 112, 116, 120, 124 and 128 may provide services to clients, such as cloud computing services or cloud storage services. The data centers may in turn include resource collections such as resources 114 of data center 112, resources 118 of data center 116, resources 122 of data center 120, resources 126 of data center 124 and resources 130 of data center 128. The system 100 may also include a plurality of endpoint routers such as endpoint router 132 and client side router 134 in some embodiments. Endpoint router 132 may be linked to the resource collections 114, 118, 122, 126, and 132 via private network paths through the provider network. Direct use of a private network path may be limited to devices and servers of the provider network, i.e., a network packet may only be physically transmitted upon a link of the private network path from a device owned or managed by the owner of the provider network. The term "path" as used herein, broadly refers to the set of links and devices traversed by a network message or packet between a source device and a destination device. The set of links of a given path may, in some cases, comprise a single wire, as when the source and destination may be linked directly by a physical cable. In other cases the path may include multiple wires and/or wireless links and several intermediary devices such as switches, gateways, routers and the like. Paths may comprise unidirectional and/or bidirectional physical links.

In the illustrated embodiment, an example client network 136 representing a respective client of the provider network 102 is shown. A client network may comprise a plurality of client devices and one or more edge routers connected by paths within the client network. In some embodiments, client devices may be organized in separate subnets with respective routing prefixes or address prefixes. For example client network 136 includes client devices 138C with subnet prefix C, client devices 138D with subnet prefix D, and client devices 138E with subnet prefix E, from which requests that are ultimately serviced at resource collections 114, 118, 122, 126, and 130 may be generated. Such client devices 138 may include a variety of systems such as desktop or racked computer systems, laptops, notebooks, tablets, smart phones and the like. Some client devices 138 may be housed at client data office premises, client data centers, or client home premises in various embodiments, and others may be mobile devices with no fixed physical location. In the illustrated environment, the client devices 138 of client network 136 have access to a client-side router—e.g., client devices 138 are connected to client-side router 134.

A cross network connection 160 or dedicated physical connection 160 or cross network connection 160 is supplied between provider network 102 and client network 136. For example, a cross-network connection 160 may include a physical link or cable between client-side router 134 and endpoint router 132. The terms cross-network connection or dedicated physical connection, as used herein, refer to a physical network connection set up between two autonomous networks. For example, within the Internet, an autonomous network may be identified by a unique Autonomous System (AS) identifier—a collection of connected Internet Protocol (IP) routing prefixes under the control of one or more network operators that presents a common, clearly defined routing policy to the Internet.

FIG. 1 also illustrates routing protocol messages 144, 146, and 148 being sent from client network 136 over dedicated physical connection 160 and being received by provider network 102 via endpoint router 132. Routing protocol message 144 includes address prefix C that indicates routing information for reaching client devices 138C. In addition, routing protocol message 144 includes a tag field value that corresponds with address prefix C and that indicates "local region." Routing protocol message 146 includes address prefix D that indicates routing information for reaching client devices 138D and a corresponding tag field value that indicates "local area." Routing protocol message 148 includes address prefix E that indicates routing information for reaching client devices 138E and does not include a tag field value that corresponds with address prefix E. For the sake of clarity English words are used as tag field values in FIG. 1. However in some embodiments, tag field values may be numerical values or any form of data that can be recognized by a provider network and/or a client network to indicate particular meanings, such as local region, local area, etc. For example, a tag field value may be formatted in accordance with a tag feature supported in the border gateway protocol (BGP). Tag field values may conform to a route tagging schema published by the provider network. For example, a provider network may publish a schema that defines the meanings of different tag field values, such as a values that indicate a local region or a local area of a provider network.

In some embodiments, a tag field value may be included in a routing protocol message, such as a BGP update message, before being received at an endpoint router of a provider network. For example, a client-side router may include a tag field value in an outgoing routing protocol message before transmitting the routing protocol message to a provider network. In some embodiments, a client device, such as one of client devices 138C, 138D, and 138E, may include a tag field value in routing information that is communicated to client-side router 134. Client side-router 134 may in turn include the tag information received from a client device in an outgoing routing protocol message. In some embodiments a client may configure the client's networking equipment in a variety of configurations to include tag field values in outgoing routing protocol messages.

In some embodiments, a routing protocol message from a client network may indicate the client desires to advertise the client's routing information in multiple regions or geographic areas of a provider network. For example a customer of a provider network may desire to have routing information for the customer's client network advertised within geographic area B of provider network 102 (that includes multiple regions). In some instances, a customer may desire to have the customer's client network routing information advertised across a larger portion of a provider network because the customer has provisioned resources in multiple geographic areas and/or regions of the provider network. For example, a customer of provider network 102 may have provisioned resources in resource collection 126 of data center 126 in portion 108 of provider network 102 and may also have resources provisioned in resource collection 130 in portion 110 of provider network 102. The customer may desire to have communications between the customer's provisioned resources in resource collections 126 and 130 routed through the customer's dedicated physical connection, such as cross network connection 160 (as opposed to some other alternative route, such as the public internet). For example, a customer may desire client devices 138D to communicate with provisioned resources in resource collections 126 and 130 over cross network connection 160. In order for provider network 102 to route communications to client devices 138D over cross network connection 160, respective pieces of networking equipment in portions 108 and 110 of provider network need to be aware of the routing information for client devices 138D via cross network connection 160. In order to make networking equipment in portions 108 and 110 aware of the customer's desired route via dedicated physical connection 160, the customer of the provider network may configure the customer's networking equipment, such as client side router 134 to include the tag "local area" in routing protocol messages that include prefix D that corresponds with client devices 138D.

Networking equipment of a provider network, such as endpoint router 132 and internal routers and pieces of networking equipment within provider network 102 may be configured to interpret a tag field value included in a routing protocol message from an external network, such as client network 136. Also, networking equipment of a provider network, such as endpoint router 132 and internal routers and pieces of networking equipment within provider network 102 may be configured to limit propagation of advertised routing information to a portion or portions of a provider network indicated by a corresponding tag field value. For example, in FIG. 1, endpoint router 132 of provider network 132 receives routing protocol message 146 that includes prefix D and a corresponding tag field value indicating "local area." In response to receiving routing protocol message 146, endpoint router and/or one or more additional pieces of networking equipment of provider network 102 distribute prefix D within portions 108 and 110 of provider network 102 that correspond with local geographic area B. Geographic area B may be considered local to client network 136 because geographic region B comprises endpoint router 132 that is connected is connected to client network 136 via a dedicated physical connection between provider network 102 and client network 136. In a similar manner, region 4 of provider network may be considered a local region to client network 136 because region 4 (portion 110) includes endpoint router 132 that is connected to client network 136 via a dedicated physical connection between provider network 102 and client network 136.

In some embodiments, a customer of a provider network may desire to only have the customer's routing information for client devices of a client network of the customer advertised within a limited portion of a provider network. For example, a customer of provider network 102 may only have provisioned resources in region 4 (portion 110) of provider network 102 and may desire to only have the customer's routing information shared within region 4 of provider network 102. The customer may include a tag field value that indicates to the provider network to only propagate a corresponding route within a local region. For example, routing protocol message 144 includes routing information for client devices 138C (prefix C) and a tag field value that indicates "local region." In response to receiving routing protocol message 144, endpoint router 132 and/or additional networking devices in provider network 102 may determine that routing protocol message 144 includes a tag field value for prefix C that indicates "local region." In response to determining that the tag field value indicates "local region," one or more computing devices and/or pieces of networking equipment of the provider network may limit distribution of routing information to a portion of the provider network indicated by the tag field. For example, endpoint router 132 and/or additional pieces of networking equipment of provider network 102 may limit distribution of prefix C to portion 110 of provider network 102.

In some embodiments, a customer of a provider network may not configure the customer's network equipment, such as client-side router 134, to include a tag field value in outgoing routing protocol messages from the customer's client network. For example, some customers may not have a preference for how far into a provider network the customer's routing information is shared or may not be sufficiently sophisticated to configure the customer's networking equipment to include tag field values in outgoing routing protocol messages from the customer's client network. Also, a customer may be satisfied with a default distribution that is applied by a provider network in the absence of tag field values being included in routing protocol messages for corresponding routes. For example, routing protocol message 148 includes address prefix E that provides routing information for client devices 138E but does not include a tag field value that corresponds with address prefix E. In some embodiments, a customer of a provider network may configure the customer's network equipment to include tag field values for some subnetwork address prefixes of the customer's client network but not include tag field values for other address prefixes or routes of the customer's client network.

In response to receiving a routing protocol message from a client network that does not include a tag field value for a corresponding route, a provider network may propagate the route included in the routing protocol message without a corresponding tag field value throughout the provider network according to one or more default address import policies. In some embodiments, a provider network may propagate routing information within the whole provider network or may propagate routing information within one or more portions of the provider network according to a default address import policy. In some embodiments, a provider network may store client profiles for customers of the provider network. A client profile stored by the provider network may include import and export policies for the customer of the provider network. For example, provider network 102 may store a client profile for the customer that operates client network 136. The client profile for the customer that operates client network 136 may include an import policy. The import policy may be to propagate routing information throughout the entire provider network. For example, address prefix E is propagated in internal routing protocol messages 152, 154, 156, and 150 to portions 104, 106, 108, and 110 of provider network 102. In some embodiments, a client's import policy stored in a client profile may include propagating routing information from the client within a smaller portion of a provider network, such as a local geographic area or local region. In some embodiments, a portion of a provider network may be a region of the provider network or a geographical area of a provider network such as a continent. A geographical area may include multiple regions. For example, a geographical area may be the North American continent and may include multiple regions such as East Coast, West Coast, South region, etc. In some embodiments, a portion of a provider network may be a subnetwork address range. In some embodiments, where a portion is defined by subnet address ranges, multiple portions of a provider network may encompass the same geographic area. In some embodiments, other designations may be used to divide a provider network into portions.

However, as shown in FIG. 1, a customer of a provider network may deviate from an import policy of a client profile stored by a provider network without changing the import policy or the client profile. For example, the customer of provider network 102 that operates client network 136 may have an import policy that indicates propagating routing information from the customer's client network 136 throughout the whole provider network 102. However, as shown in FIG. 1, by including tag field values, such as in routing protocol messages 144 and 146, the customer of the provider network may alter the distribution of the customer's routing information for particular routes without changing the customer's import policy or client profile. The customer may alter how far the customer's routing information is shared within the provider network remotely by changing configurations of the customer's networking equipment to include different tag field values.

FIG. 1 also illustrates a routing protocol message 142 being sent from provider network 102 to client network 136 via cross network connection 160. A routing protocol message from a provider network may include routing information for resource collections of the provider network and corresponding tag field values that indicate particular portions of the provider network in which the resources that correspond with respective routes are located. For example, routing protocol message 142 includes address prefix B4 that corresponds with resources 130 in portion 110 of provider network 102 (Area B, Region 4), address prefix B3 that corresponds with resources 126 in portion 108 of provider network 102 (Area B, Region 3), and address prefix A1$b$ that corresponds with resources 118 in portion 104 of provider network 102 (Area A, Region 1). Routing protocol message 142 also includes tag field values that correspond with the routes included in routing protocol message 142. Address prefix B4 has a corresponding tag field value "local region" indicating that resources associated with address prefix B4 are located in a local region of provider network 102 that is local to where a dedicated physical connection between provider network 102 and client network 136 is located. Address prefix B3 has a corresponding tag field value "local area' indicating that resources associated with address prefix B3 are in a geographic area of provider network 102 that is local to where a dedicated physical connection between provider network 102 and client network 136 is located. Finally, address prefix A1$b$ does not include a tag field value that corresponds with the address prefix. The lack of a tag field value may indicate that resources that correspond with the address prefix being advertised are not located in a local region or a local geographic area. In some embodiments, a global tag field value may be used for resources that are not located in a local region or a local geographic area. In some embodiments, other divisions of a provider network may be used. For example, additional tag field values may correspond to intermediate portions of a provider network that are larger than a local region but smaller than a local geographic area. Also in some embodiments, additional tag field values may correspond to larger portions of a provider network that include multiple geographic areas. In some embodiments, a global tag field value may be used.

In response to receiving routing protocol message 142, client side-router 134 adds address prefix B4 to client routing table 140 managed by client network 136. However, address prefixes B3 and A1$b$ included in routing protocol message 142 are not added to client routing table 140. For example, client network 136 may have an import policy to only include routing information for resources of provider network 102 in client routing table 140 that are located in portion 110 of provider network 102 that is a local region to client network 136. In some embodiments, a client network may have different import polices that may include only adding routing information for resources of a provider network that are in a local geographic area of a provider network (such as Area B) or adding routing information for all resources of a provider network into the client routing table. In some embodiments, a client network may utilize various other import polices based on tag field values.

In some embodiments, address prefixes for resources of a provider network may be private IP address assigned by the customer of the provider network for resources of the provider network provisioned to the customer. In some embodiments, address prefixes for resources of a provider network may be public IP addresses assigned to the resources from a set of public IP addresses of the provider network.

In some embodiments, tag field values included in routing protocol messages from a client network or tag field values included in routing protocol messages from a provider network do not reveal the structure or backbone of the provider network. For example, tag field values may indicate "local region" or "local area" without identifying the local area or local region. In this way, tag field values may not indicate how many local regions are included in a provider network, how many geographic areas are included in a provider network, or how many regions are included in specific geographic areas. Instead, the provider network, may determine the local area or local region that is indicated in the tag field value based on the area or region in which an endpoint router that implements a dedicated physical connection over which the routing protocol message is received is located. In some embodiments, a local region may be within a local geographic area that includes multiple regions.

In addition to the network paths illustrated in FIG. 1, in many environments there may be several other alternative network paths available between client network 136 and various components of the system 100. For example, a client network, such as client network 136 may communicate with resources of a provider network over a non-dedicated physical connection path, such as the public internet.

Figure 1B:
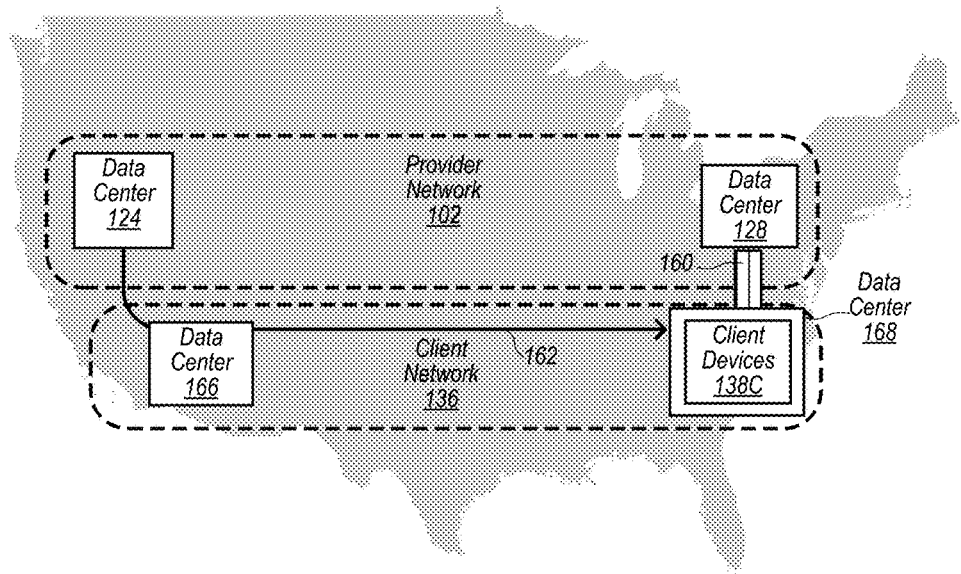
FIG. 1B, illustrates messages being routed between a provider network and a client network that both span a geographical area, according to some embodiments.

FIG. 1B, illustrates messages being routed between a provider network and a client network that both span a geographical area, according to some embodiments. FIG. 1B illustrates provider network 102 and client network 136 on a geographic map of the United States. Provider network 102 includes data center 124 and data center 128. Client network 136 includes data center 166 and data center 168 that includes client devices 138C. Provider network 102 and client network 136 may be the same provider network 102 and client network 136 as illustrated in FIG. 1A. As an example, Area B described in FIG. 1A may be North America and region 3 and region 4 may be the West coast and East Coast respectively. For sake of clarity, provider network 102 and client network 136 are shown to only span the North American continent, but (though not shown) client network 136 and provider network 102 may span a larger geographic area. For example, geographical area A of provider network 102 may include another continent. As another example, client devices 138D and 138E may be located in another continent that is included in client network 136 or may be located in data center 166 or data center 168.

Routing path 162 illustrates packets being sent from resources provisioned to the customer that operates client network 136 that are located in data center 124 to client devices 138C in data center 168 of client network 136. In FIG. 1A routing information for address prefix C has been tagged as "local region." Thus data center 128 is aware of a route to client devices 138C via cross network connection 160. However, because the route to client devices 138C via cross network connection 160 was tagged as local region, provider network 102 did not propagate the route to data center 124 that is in a different region of provider network 102 than data center 128. Thus when resources of data center 124 communicate with client devices 138C, their communications are not routed along the route through cross-network connection 160. For example, a route is determined via an alternate connection between provider network 102 and client network 136, such as the public internet or a separate dedicated physical connection. Communications are then routed across regions via the backbone of client network 136.

Figure 1C:
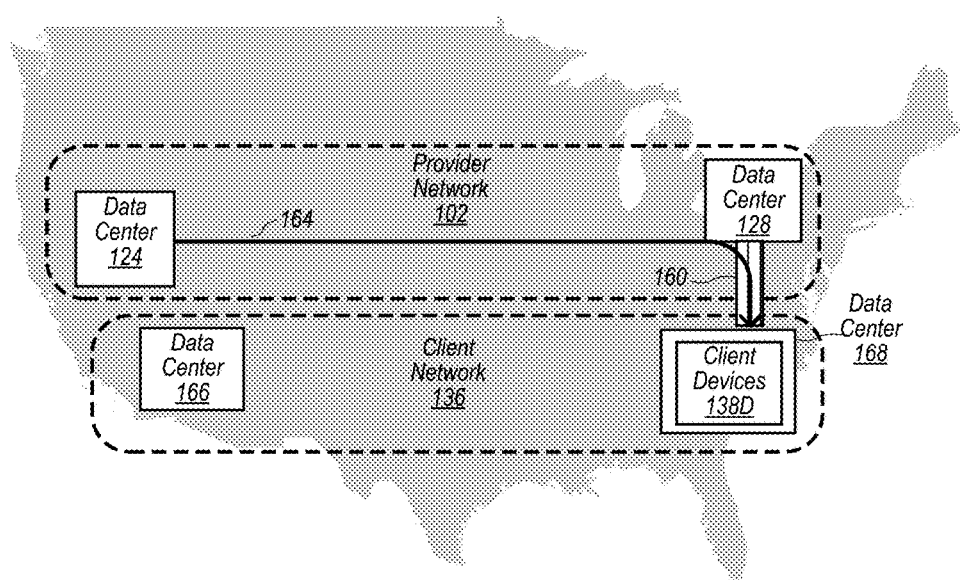
FIG. 1C, illustrates messages being routed between a provider network and a client network that both span a geographical area, according to some embodiments.

FIG. 1C, illustrates messages being routed between a provider network and a client network that both span a geographical area, according to some embodiments. For various reasons, such as cost, reliability, latency etc. A customer of a provider network may desire to have cross-regional traffic routed through the provider network's backbone network across regions and routed to client devices of the customer via a dedicated physical connection established between a provider network and a client network of the customer. FIG. 1C illustrates routing path 164 that illustrates packets being sent from resources provisioned to the customer that operates client network 136 that are located in data center 124 to client devices 138D in data center 168 of client network 136. As shown in FIG. 1A, routing protocol message 146 indicated that the route that includes address prefix D for client devices 138D was to be propagated throughout a local geographic area of provider network 102. In some embodiments, a local geographic area may be a continent, such as North America. Because the route for client devices 138D was propagated throughout the local geographic area that includes data center 124, networking equipment in data center 124 is aware of the route to client devices 138D over cross-network connection 160. So that traffic from resources in data center 124 to client devices 138D are routed across regions via the provider network's backbone and routed over cross network connection 160 between provider network 102 and client network 136.

As will be apparent to a person of ordinary skill in the art, various strategies of limiting distribution of routes over dedicated physical connections can be used to manipulate how traffic is routed between a provider network and a client network. As discussed above, by limiting or not limiting distribution of routes to particular regions or geographical areas of provider networks and client networks that span multiple regions or geographical areas, traffic can be preferentially routed through a provider network's backbone across regions or geographic areas or can be preferentially routed through a client network's backbone across regions or geographic areas.

Example Portions of Routing Protocol Messages

FIG. 2A illustrates an example of constituent elements of a routing protocol message from a provider network that includes routing information and tag field values, according to some embodiments. A routing protocol message, such as routing protocol message 204, may be a BGP routing protocol message transmitted from a provider network to a client network during a BGP session. In some embodiments, other suitable routing protocols may be used. Routing protocol message 204 includes a BGP header 202 indicating that the message is an update message. Routing protocol message 204 also includes path attributes 208 and corresponding network layer reachability information 212. In some embodiments, path attributes 208 may include respective BGP community tag field values that correspond with respective address prefixes included in network reachability information 212. In some embodiments, a first set of values in one of the path attributes included in path attributes 208 may indicate that a tag field is present that goes along with a corresponding address prefix included in network reachability information 212, and a second set of values may indicate a tag field value for that tag field.

For example path attributes 208 include path attribute XXXX:YYYY and path attribute XXXX:ZZZZ. In the example path attribute included in path attributes 208, the first part of the path attribute, for example XXXX, may include values that are used to indicate that the path attribute is a tag field. For example, XXXX may be a numerical value such as 1234 and the value '1234' may indicate that the path attribute is a tag field. In the example path attribute XXXX: YYYY, 'YYYY' may represent values that indicate a particular value assigned to the tag field. For example, YYYY may be any numerical value such as 5678 and the value '5678' may indicate that the tag field value indicates a local region of a provider network. As another example, YYYY may be 4321 and the value '4321' may indicate a local area of a provider network. (Note the values '1234', '5678', and '4321' are given for illustration purposes only. Various other values may be used in a routing protocol message in accordance with the routing protocol, such as the border gateway protocol, BGP. In routing protocol message 204 each path attribute may correspond with a respective route included in network layer reachability information (NLRI) 212. For example, path attribute XXXX:YYYY may correspond with address prefix AAA.AA. AA/AA and indicate that there is a tag field associated with address prefix AAA.AA. AA/AA and that the value of the community field tag associated with address prefix AAA.AA AA/AA is 'YYYY.'' In a similar manner, path attribute XXXX: ZZZZ may correspond with address prefix BBB. BB. BB/BB and indicate that a tag field value of 'ZZZZ' is associated with address prefix BBB. BB. BB/BB. In some embodiments, a two-tiered community field tag value scheme may be used. For example, 'YYYY' may indicate that an address prefix that corresponds with the path attribute that includes a tag field value of 'YYYY' is an address prefix for resources of a provider network in a local region of the provider network and 'ZZZZ' may indicate that resources associated with the corresponding address prefix are located in a local geographic area of the provider network. In some embodiments, a routing protocol message may include an address prefix that lacks a path attribute for the address prefix indicating a value of a tag field. The lack of a tag field value may indicate that the address prefix is associated with resources that are not in a local region a local geographic area of the provider network.

In some embodiments, other naming conventions may be used to identify portions of a provider network using community field tag values. For example, tag field values may include additional designations for a local country, local continent, or a global address, as examples.

FIG. 2A illustrates a portion of routing protocol message 204, in some embodiments, a routing protocol message sent between a provider network and a client network may include more or less fields. In some embodiments a routing protocol message, such as routing protocol message 204 may include any number of address prefixes and corresponding community field tag field values. For example, routing protocol message 204 includes two address prefixes and two corresponding tag field values, however in some embodiments routing protocol message 204 may include a single address prefix and a single corresponding tag field value or may include more than two address prefixes and more than two corresponding tag field values. In some embodiments a routing protocol message, such as routing protocol message 204 may include some address prefixes that do not have corresponding tag field values (i.e. the tag field is empty as illustrated by NONE in FIG. 1) along with address prefixes that have corresponding tag field values. In some embodiments, address prefixes included in a routing protocol message, such as routing protocol message 204 may be portions of a private IP address assigned by clients of a provider network for resources of the provider network provisioned to the client. In some embodiments, address prefixes included in a routing protocol message, such as routing protocol message 204, may be portions of public IP addresses. As referred to herein, an address prefix may indicate a "route."

FIG. 2B illustrates an example of constituent elements of a routing protocol message from a client network that includes routing information and tag field values, according to some embodiments. Routing protocol message 216 includes BGP header 214 indicating that the message is a BGP update message. In some embodiments, other suitable routing protocols may be used. Routing protocol message 216 also includes path attributes 220 and network layer reachability information (NLRI) 222. Routing protocol message 216 may be sent from a client network to a provider network via a dedicated physical connection. Path attributes 220 may include tag field values that indicate to a provider network that receives routing protocol message 216 what portions of the provider network a client network that sent routing protocol message 216 desires routing information included in routing protocol message 216 to be distributed within. For example path attribute XXXX:WWWW may indicate that corresponding address prefix CCC.CC.CC/CC is to be distributed within a local region of a provider network receiving routing protocol message 216. Path attribute XXXX: VVVV may indicate that corresponding address prefix DDD. DD.DD/DD is to be distributed within a local geographic area of a provider network that receives routing protocol message 216. Address prefix EEE.EE.EE/ EE may not have a corresponding tag value associated with it and address prefix EEE.EE.EE/EE may be distributed within a provider network that receives routing protocol message 216 according to an import policy associated with a client sending routing protocol message 216 or according to some other import policy of a provider network receiving routing protocol message 216.

Figure 3:
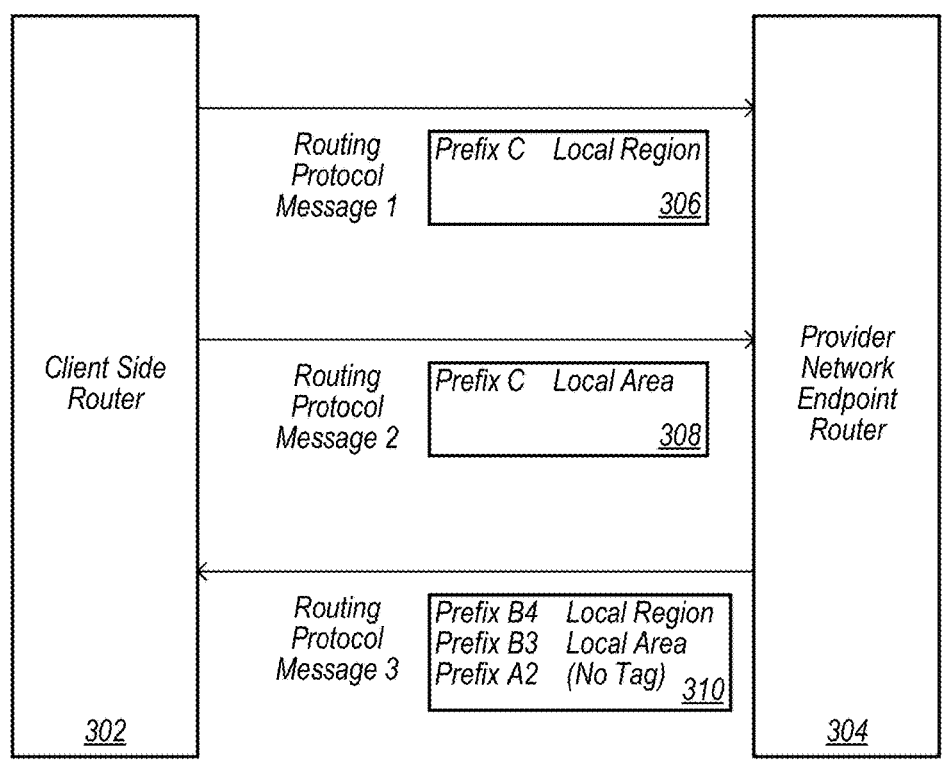
FIG. 3 illustrates routing protocol messages being exchanged between a client-side edge router and a provider network endpoint router, according to some embodiments.
Figure 4:
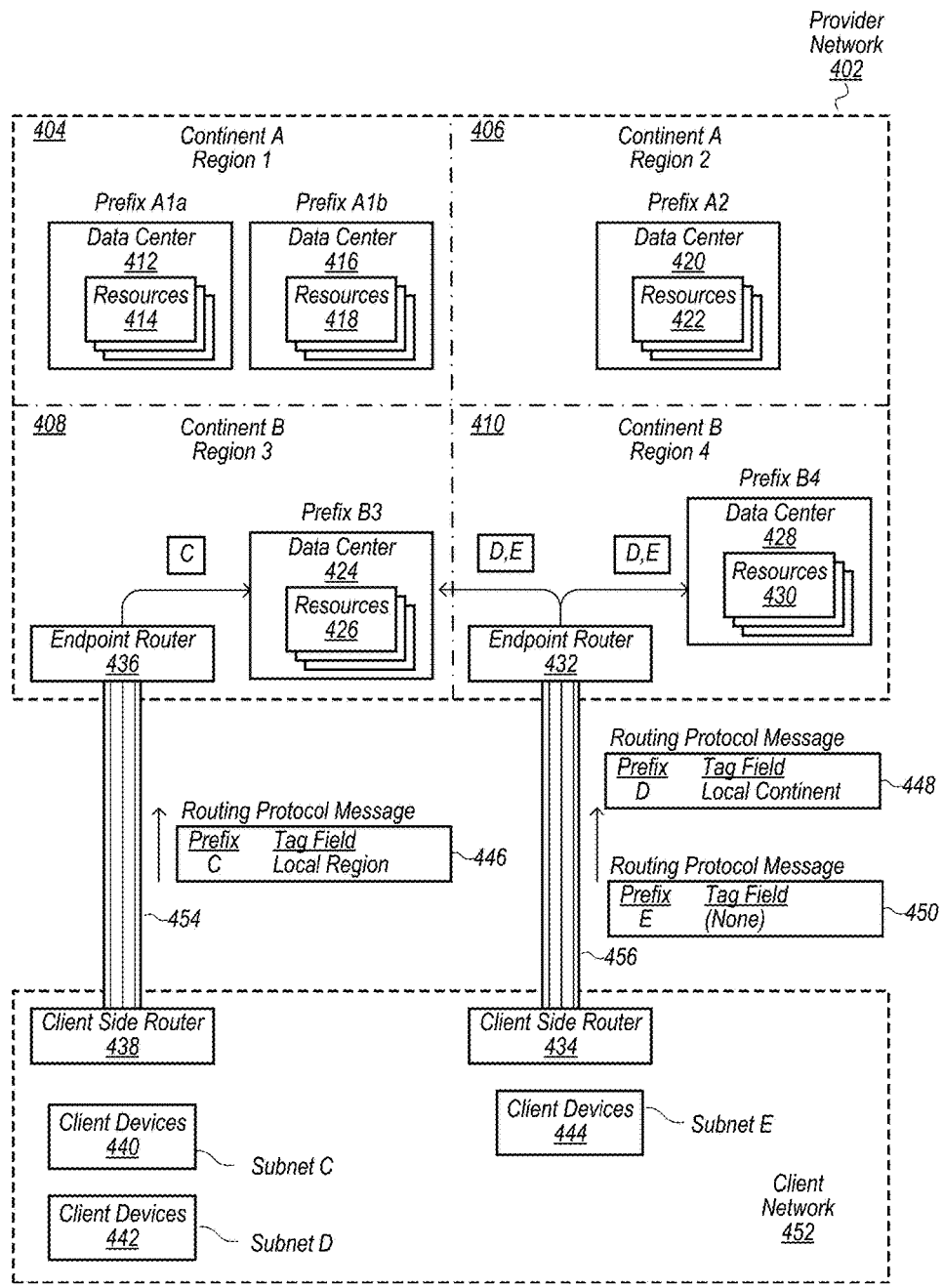
FIG. 4 illustrates a provider network and a client network that are connected via multiple dedicated physical connections, according to some embodiments.

Example Message Exchanges Between a Provider Network and a Client Network Via a Dedicated Physical Connection FIG. 3 illustrates routing protocol messages being exchanged between a client side edge router and a provider network endpoint router, according to some embodiments. In a system such as system 100 illustrated in FIG. 1, a client network may remotely change how the client network's routing information is routed within a provider network. For example, a client network may initially desire to have a portion of the client network's routing information distributed within a limited portion of a provider network. Subsequently, a client network may desire to have the same routing information distributed within an additional portion or larger area of a provider network. FIG. 4 illustrates routing protocol messages 306, 308, and 310 being exchanged between client side router 302 and provider network endpoint router 304. In some embodiments each routing protocol message may be transmitted during a separate routing protocol session, such as a BGP session, between client side router 302 and provider network endpoint router 304. In some embodiments, multiple routing protocol messages such as routing protocol message 308 and 310 may be exchanged during the same routing protocol session. Routing protocol message 306 includes address prefix C for client devices of a client network that includes client side router 302. Routing protocol message 306 also includes a tag field value that indicates that address prefix C is to be propagated within a local region of a provider network that includes provider network endpoint router 304. In response to receiving routing protocol message 306, the provider network that includes provider network endpoint router 304 may propagate address prefix C within a local region of the provider network. Subsequently, a customer operating the client network that includes client side router 302 may decide that the customer desires to have address prefix C propagated throughout a larger portion of the provider network. For example, the customer may have provisioned additional resources of the provider network that are outside of the local region of the provider network. In order to change the area of the provider network in which address prefix C is propagated, the customer of the provider network may re-configure client side router 302 to include a different tag field value in outgoing routing protocol messages. For example, routing protocol message 308 includes a tag field value that indicates address prefix C is to be propagated in a local area of the provider network. In response to receiving routing protocol message 308, a provider network that includes provider network endpoint router 304 may propagate address prefix throughout a larger portion of the provider network such as a local geographic area.

As discussed before, a provider network may also provide routing protocol messages to a client network indicating routing information for resources of a provider network and including corresponding tag field values that indicate portions of the provider network where the resources that are associated with the routes are located. For example routing protocol message 310 from provider network endpoint router 304 includes prefixes B4, B3, and A2 and tag field values that indicate resources associated with prefix B4 are located in a local region, resources associated with prefix B3 are located in a local geographic area, and resources associated with prefix A2 are located globally (but not in a local region or a local geographic area). In some embodiments, an address prefix that corresponds with resources that are not located in a local region or a local geographic area may not include a tag field value. In some embodiments, provider network endpoint router 304 may perform translation of incoming internal routing protocol messages from pieces of networking equipment within a provider network, such as other routers within a provider network, to include tag field values. For example, an internal router within a provider network may send a routing protocol message to provider network endpoint router 304 indicating an address prefix for a set of resource newly added to the provider network. Provider network endpoint router may then insert a tag field value in an outgoing routing protocol message, such as routing protocol message 310, indicating what portion of the provider network resources associated with an address prefix are located. In some embodiments, a provider network endpoint router may include multiple tag field values for an address prefix or route. For example resources associated with an address prefix may be located both in a local region of the provider network and a local geographic area of the provider network. An endpoint router, such as endpoint router 304 may tag the route with tag field values indicating both 'local region' and 'local area.' A customer of a provider network may then configure the customer's network equipment to add routes with certain tags to a routing table managed by the customer's client network. For example, the customer may configure the customer's client-side router to add all routes tagged local area or to add all routes tagged as local region.

As can be seen, in systems, such as system 100 illustrated in FIG. 1, routing protocol messages such as routing protocol messages 306 and 308 may allow a customer of a provider network to change routing configurations in the provider network for the customer's routing information without changing the client's profile or import policy stored by the provider network.

Illustrative System Environment with Multiple Dedicated Physical Connections

FIG. 4 illustrates a provider network and a client network that are connected via multiple dedicated physical connections, according some embodiments. Provider network 402 includes portions 404, 406, 408, and 410. In some embodiments, a geographic area of a provider network may be a content, such as the North American continent, European continent, etc. Portions 404 and 406 of provider network 402 span Continent A and respectively include region 1 and region 2. Portions 408 and 410 span Continent B and respectively include region 3 and region 4. Portion 404 includes data center 412 that includes resource collations 414 and data center 416 that includes resource collections 418. Portion 406 includes data center 420 that includes resource collections 422, portion 408 includes data center 424 that includes resource collections 426, and portion 410 includes data center 428 that includes resource collections 430. Endpoint router 432 is located in portion 410 that covers region 4 and a portion of continent B. Endpoint router 436 is located in portion 408 that covers region 3 and an additional portion of continent B. A dedicated physical connection is established between provider network 402 and client network 452 via endpoint router 432 and client side router 434. An additional dedicated physical connection is established between endpoint router 436 and client side router 438. The dedicated physical connections illustrated in FIG. 4 may be established in a similar manner as the cross-network connection 160 described in regard to FIG. 1.

Client network 452 includes client devices 440, 442, and 444. Client network 452 also includes client side routers 434 and 438 that implement dedicated physical connections with provider network 402.

In some embodiments, a customer operating a client network may desire to receive network traffic for a particular set of client devices via a different dedicated physical connection than other network traffic from a provider network. For example, a customer operating client network 452 may desire to receive network traffic for client devices 440 (that have an associated address prefix C) over cross network connection 454 and may desire to receive network traffic for client devices 442 (that have an associated address prefix D) and client devices 444 (that have an associated address prefix E) over cross network connection 456. In order to effectuate receiving traffic as desired by the customer that operates the client network. The client network may send routing protocol message 446 over cross network connection 454 that includes a tag field value indicating that address prefix C is to only be propagated in a local region of provider network 402. In response, address prefix C may only be propagated in portion 408 of provider network 402.

Client network 452 may also send routing protocol messages 448 and 450 via cross network connection 456 that is located in continent B. Routing protocol message 448 may include a tag field value that instructs provider network 402 to propagate address prefix D within local continent B. Routing protocol message 450 does not include a tag field value. In response to receiving routing protocol message 450, provider network 402 may propagate address prefix E according to a stored import policy. For example the stored import policy may be to propagate address prefixes that do not have corresponding tag field values within a local continent, such as continent B. In response, provider network 402 may propagate address prefix E throughout continent B. By limiting portions of a provider network that receive routing information for client devices of a client network, a client network may control which cross network links are used to route traffic to particular client devices. In some embodiments, a client network may limit how the client network's routing information is distributed in a provider network to cause interregional traffic to be selectively transported on the provider network's back bone or on the client network's back bone. For example, a client network may determine that it is advantageous (faster, cheaper, etc.) to transport inter-regional traffic on its own backbone as opposed to on a provider network's backbone. In some situations a client network may determine it is advantageous to transport inter-regional traffic via a provider network's backbone. By altering how the client network's routing information is propagated in a provider network, the provider network may cause inter-regional traffic to travel on either the client network's backbone or the provider network' backbone.

For example, client devices 442 that correspond with address prefix D are located near client devices 440 that correspond with address prefix C. However, because client network 452 only advertises address prefix C via cross network connection 454, resources 426 of provider network 402 that are located in region 3 must communicate with client devices 442 via the provider network's backbone that connects regions 3 and regions 4. This is because resources 426 are unaware of a routing path to client devices 442 via cross-network connection 454. Thus inter-regional traffic between resources 426 and client devices 442 is transported via the provider network 402's backbone network.

In some embodiments, various other routing information propagation strategies may be used to manipulate how inter-regional, inter-continental or global traffic is exchanged between provider networks and client networks that extend across multiple regions, continents, etc.

Figure 5:
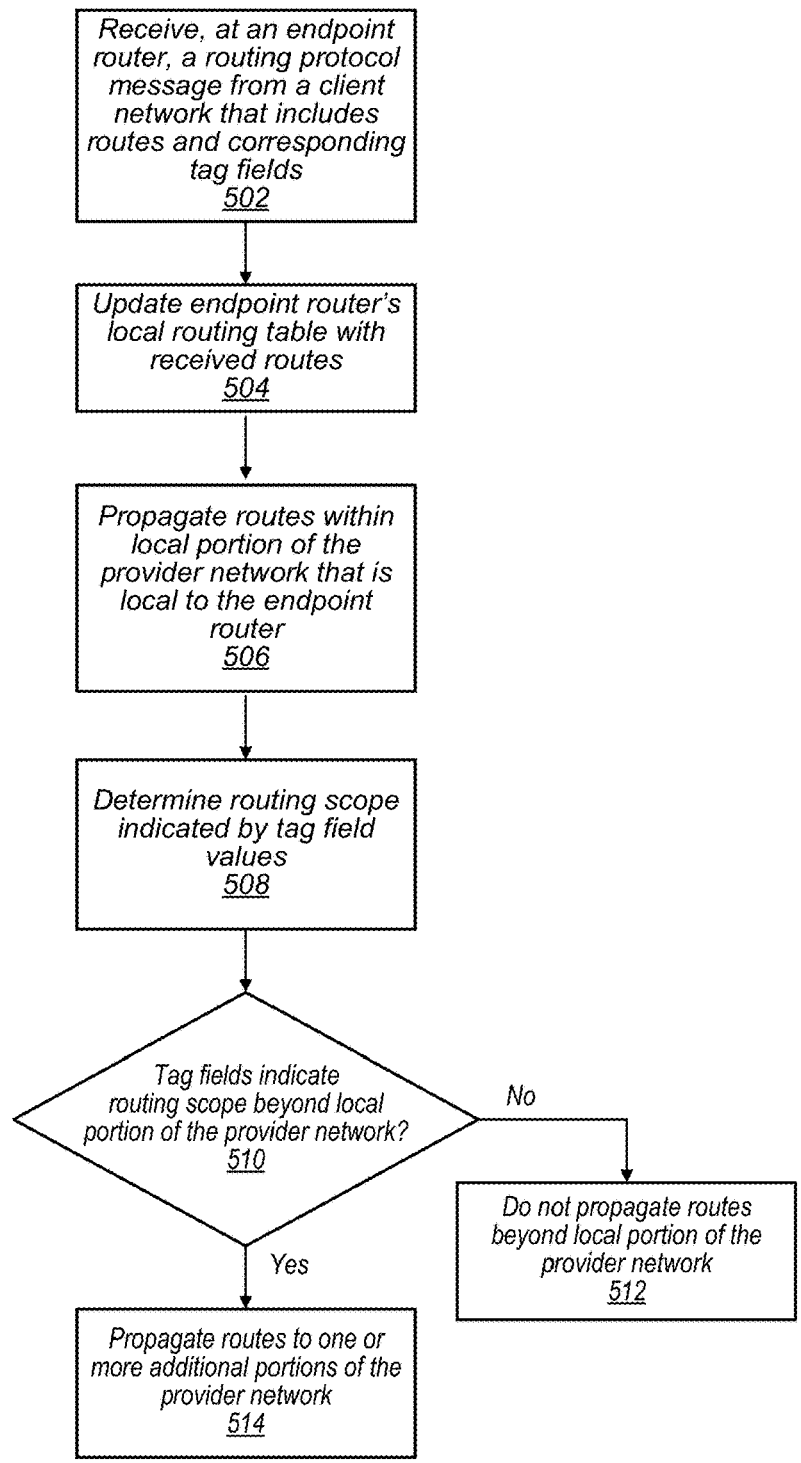
FIG. 5 is a flow chart illustrating propagating routing information received from a client network within a provider network, according to some embodiments.

FIG. 5 is a flow chart illustrating advertising routing information received from a client network within a provider network, according to some embodiments. At 502 an endpoint router of a provider network receives a routing protocol message, such as a BGP routing protocol message from a client network. The routing protocol message may include routing information, such as address prefixes, for client devices of the client network. The routing protocol message may also include corresponding tag field values that correspond with pieces of routing information, such as address prefixes, included in the routing protocol message.

At 504, in response to receiving the routing protocol message, the endpoint router may update the endpoint router's local route table with the received routes. In some embodiments, a tagging schema published by the provider network may be used to tag routes included in a routing protocol message such that tags are tagged local region or local area. In such a schema, an endpoint router that receives a routing protocol message may be both in the local region and the local area.

At 506, networking equipment within a provider network, such as routers of the provider network, propagate the received routes within a local portion of the provider network that is local to the endpoint router that received the routing protocol message. In some embodiments, "local" may be in regard to the endpoint router that received a routing protocol message. For example, a local region may be region where the endpoint router that received the routing protocol message is located. As another example, a local geographic area may be a geographic area where the endpoint router that received the routing protocol message is located. In some embodiments, a local geographic area may include a local region and one or more regions.

At 508, after propagating the routes within a local portion of a provider network, for example after propagating the routes within a local region of the provider network, a routing scope indicated by the tag field values may be determined. For example, a route may have a corresponding tag field value that indicates a 'local area' or may include multiple tags, where one tag indicates a 'local region' and another tag indicates 'local area.' In some embodiments, routes that do not have corresponding tag field values may be propagated according to an import policy that may include propagating the routes beyond a local portion or region of a provider network.

At 510 it is determined if the routing scope of the tag field values indicates a routing scope beyond the local portion of the provider network. At 512 in response to determining the tag field values do not indicate a routing scope beyond the local portion of the provider network, the routes are not propagated beyond the local portion of the provider network.

At 514, in response to determining the routing scope of the tag field values indicates a routing scope beyond the local portion of the provider network, the routes are propagated within one or more additional portions of the provider network.

Figure 6:
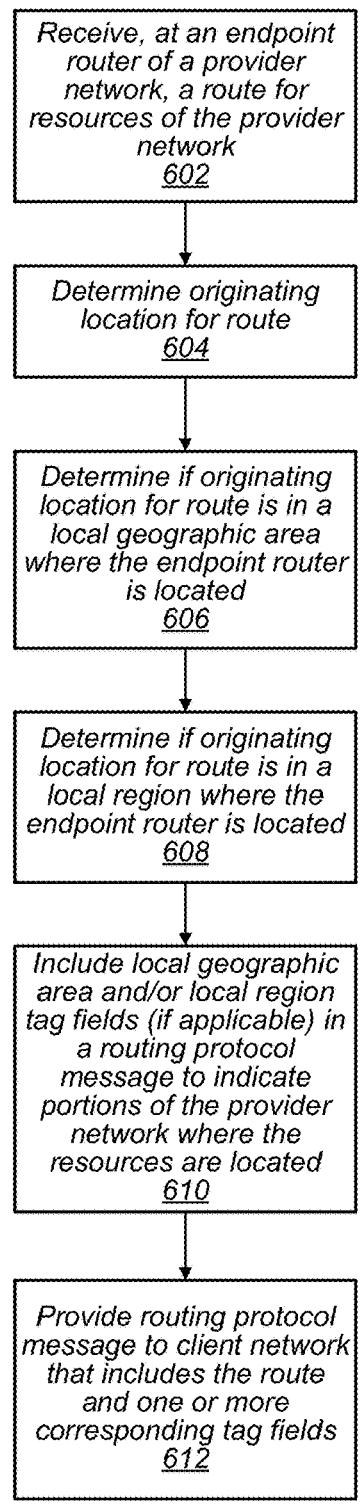
FIG. 6 is a flow chart illustrating a provider network providing routing information with corresponding tag fields to a client network, according to some embodiments.

FIG. 6 is a flow chart illustrating a provider network providing routing information with corresponding tags to a client network, according to some embodiments. At 602, an edge router or endpoint router of a provider network receives routing information for resources of the provider network located within the provider network. For example, new resources may have been added to the provider network, or routing information for existing resources of the provider network may have changed.

At 604, the endpoint router determines an originating location of the route. At 606, the endpoint router determines if the originating route is in a local geographic area local to the endpoint router. For example the endpoint router may determine if the route originates in the local geographic area where the endpoint router is located.

At 608, the endpoint router determines if the originating route is in a local region local to the endpoint router. For example the endpoint router may determine if the route originates in the local region where the endpoint router is located.

At 610, the endpoint router of the provider network may include tag field values in an outgoing routing protocol message. The tag field values may indicate a portion of the provider network where resources associated with the routing information are located. In some embodiments, an endpoint router of a provider network may perform translation operations on routing information received from internal resources of a provider network before including the routing information in an outgoing routing protocol message to a client network. Internal information indicating the location in the provider network, if communicated outside the provider network, may reveal information about the structure of the provider network. For example the information indicating the location in the provider network may indicate a particular data center in a particular geographic location. The endpoint router may translate the location information into a tag field value that indicates "local region" or "local continent" or both. Because the tag field values do not identify specific locations, just whether resources associated with the address prefixes are located in a local region or local continent, the tag field values may not reveal the structure of the provider network, such as how many data centers are included in the provider network or where they are located.

At 612, the endpoint router or endpoint router of the provider network provides a routing protocol message to a client network via a dedicated physical connection that includes routing information, such as an address prefix, and a corresponding tag field value. The tag field value may indicate that resources associated with the address prefix are located in a local region or local geographic area of the provider network as the client network that is connected to the provider network via the dedicated physical connection.

Figure 7:
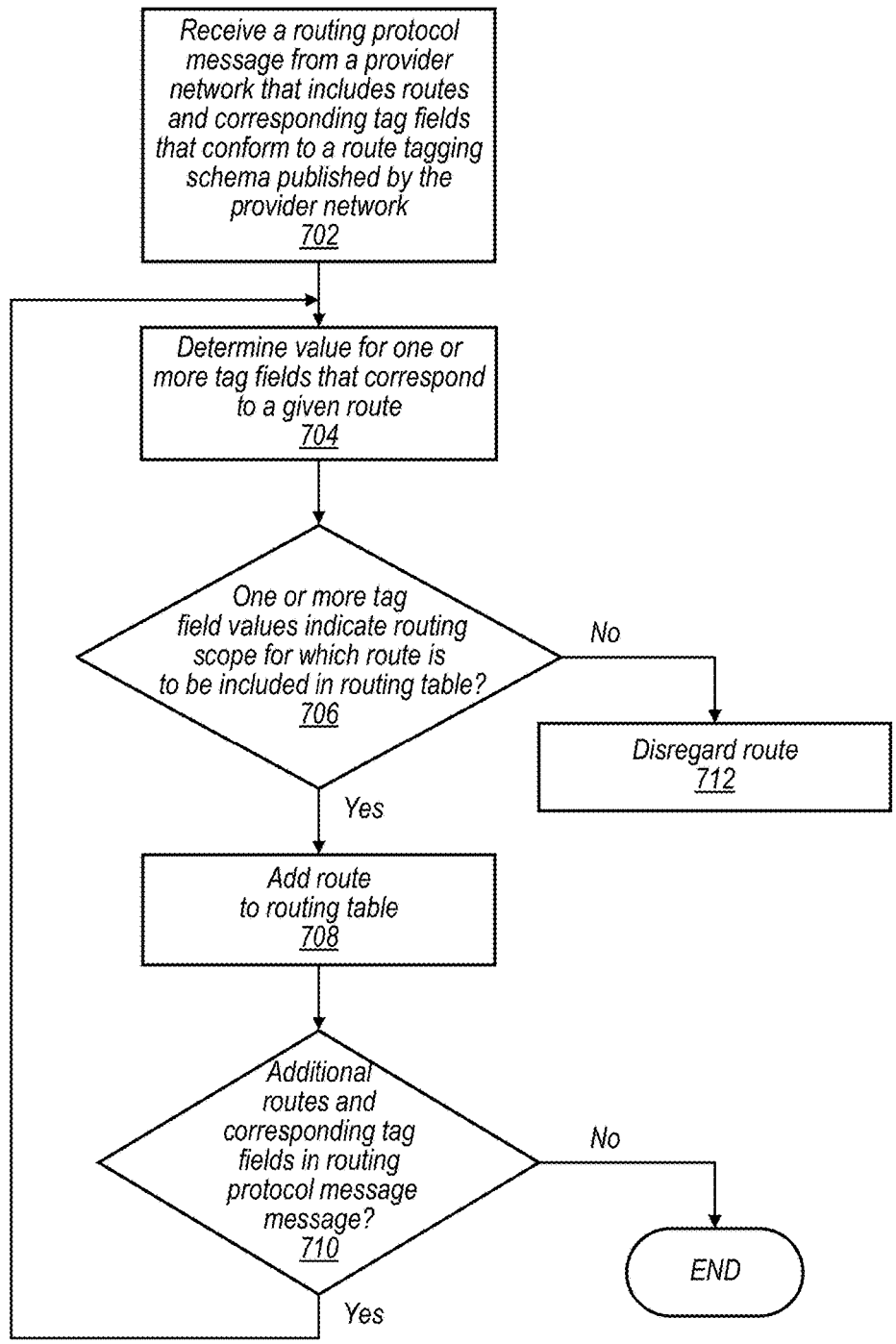
FIG. 7 is a flow chart illustrating a client network adding received routing information to a routing table managed by the client network, according to some embodiments.

FIG. 7 is a flow chart illustrating a client network adding received routing information to a routing table managed by the client network, according to some embodiments. At 702 a client side router of a client network receives a routing protocol message from a provider network via a dedicated physical connection. The routing protocol message may include routing information or routes, such as address prefixes, and corresponding tag field values indicating portions of the provider network that correspond with the routing information. The tag field values may conform to a route tagging schema published by the provider network.

At 704, the client side router or another piece of networking equipment of the client network may determine a value of one or more tag fields included in the routing protocol message.

At 706, it is determined if a first tag field value that corresponds with a first route indicates a portion of the provider network for which routing information is to be included in a routing table managed by the client network. For example, a client side router may be configured to add address prefixes that have certain corresponding tag field values to a routing table managed by the client side router.

At 712, in response to determining a tag field value indicates a portion of the provider network for which routing information is not to be included in the client's routing table, the routing information is disregarded, i.e. not added to the routing table. For example, a client side router may be configured to only add routing information for resources of a provider network that are located in a local region of the provider network. In response to receiving an routing protocol message that includes tag field values that indicate corresponding routes, such as corresponding address prefixes, are located in a local geographic area (but not a local region), the client side router may be configured to not include the corresponding routes in the routing table.

At 708, in response to determining the routing information does correspond to a portion of the provider network for which routing information, such as address prefixes or routes, are to be added to the routing table, the routing information is added to the routing table.

At 710, it is determined if there are additional routes, such as additional address prefixes, included in the routing protocol message. In response to determining there are not additional routes to be considered for addition to the routing table, the process ends. In response to determining there are additional routes to be considered for addition in the routing table, the process reverts to 704 and determines a tag field value for the next route included in the routing protocol message.

Figure 8:
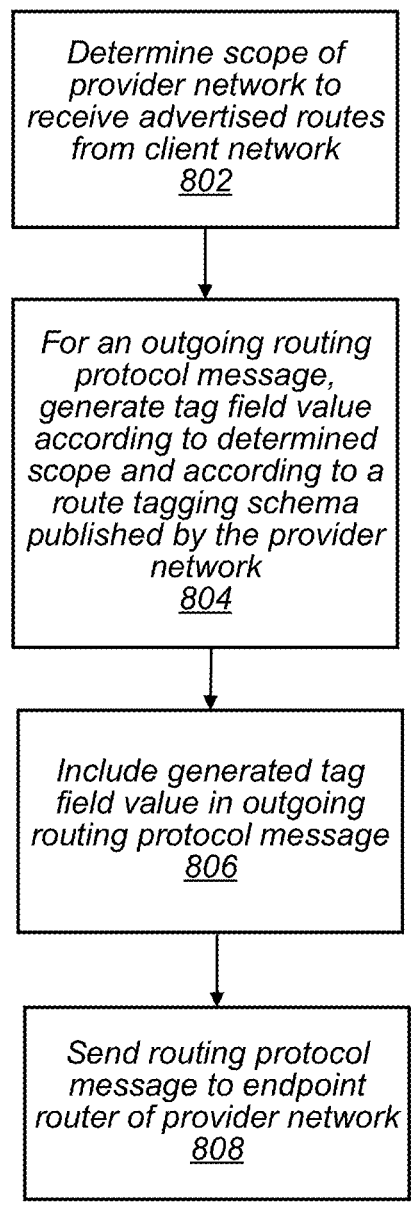
FIG. 8 is a flow chart illustrating a client network providing routing information with corresponding tag field values to a provider network, according to some embodiments.

FIG. 8 is a flow chart illustrating a client network providing routing information with corresponding tag field values to a provider network, according to some embodiments. At 802 the client network determines a scope of the provider network that is to receive advertised routes from the client network. For example the client network may determine that advertised routes from the client network are only to be propagated in a local region or a local area of a provider network. In some embodiments, a client network may determine different scopes for different routes.

At 804, for an outgoing routing protocol message, a client side router of the client network generates a tag field value for a route in accordance with the determined scope and in accordance with a rout tagging schema published by the provider network that defines tag field values.

At 806, the client-side router includes the generated tag field value in an outgoing routing protocol message. At 808, the client-side router sends the routing protocol message to the provider network via the dedicated physical connection between the provider network and the client network.

Illustrative Computer System

Figure 9:
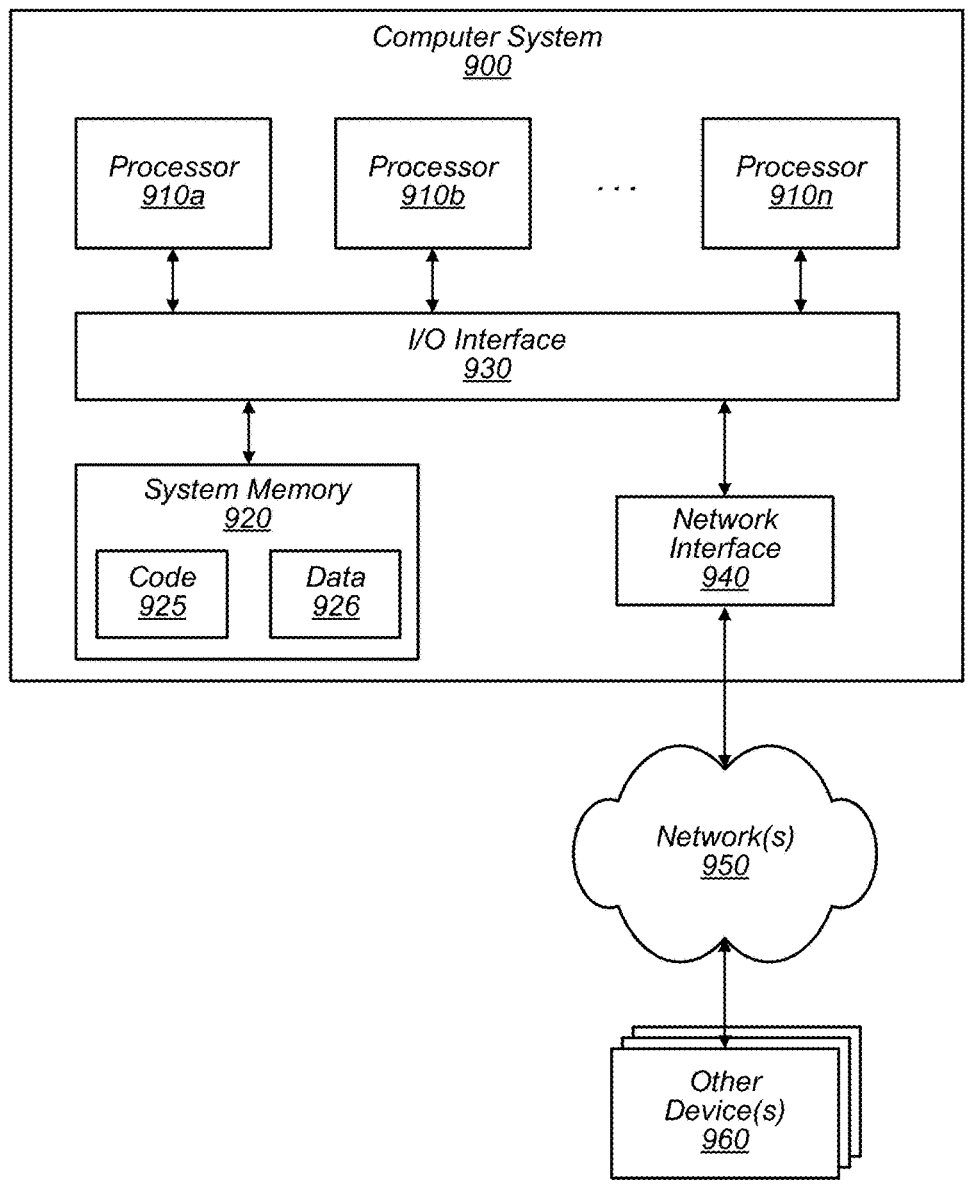
FIG. 9 is a block diagram illustrating an example computer system that may be used in some embodiments.

In at least some embodiments, a router or server that implements a portion or all of one or more of the technologies described herein, including the techniques to analyze an incoming routing protocol message and techniques to include tag values in outgoing routing protocol messages, may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices, such as routers, as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 7 for implementing embodiments of methods and apparatus for managing routing information using tag fields. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
   a provider network comprising a plurality of physical computing devices configured to implement resources of the provider network; and
   an endpoint router of the provider network, wherein the endpoint router is connected to a client network of a client of the provider network via a dedicated physical connection between the provider network and the client network,
   wherein one or more networking devices of the provider network are configured to:
      receive, via the endpoint router, a routing protocol message from the client network, wherein the routing protocol message comprises:
         one or more respective routes for devices of the client network; and
         one or more respective tag fields populated with respective values, wherein respective ones of the routes correspond with respective ones of the one or more respective tag fields; and
      propagate the one or more respective routes within the provider network based, at least in part, on one or more respective values of the one or more respective tag fields,
         wherein for a given respective tag field that indicates a local routing scope, the one or more networking devices of the provider network are configured to propagate a respective route that corresponds with the given respective tag field within a limited portion of the provider network that includes the endpoint router, and
         wherein for another given respective tag field that indicates a larger routing scope, the one or more networking devices of the provider network are configured to propagate the respective route that corresponds with the other given tag field within a larger portion of the provider network that includes the endpoint router.

2. The system of claim 1, wherein the larger portion of the provider network includes the limited portion of the provider network.

3. The system of claim 1, wherein the routing protocol message is a border gateway protocol (BGP) update message received during a BGP session between the endpoint router of the provider network and a client side router of the client network, and
   wherein the tag field is a BGP community tag field in the BGP update message.

4. The system of claim 1, wherein the one or more networking devices of the provider network are further configured to:

send to the client network, via the endpoint router, a separate routing protocol message that comprises a route for resources of the provider network and a tag field value that indicates a portion of the provider network in which the resources are located, wherein the tag field value is formatted according to a route tagging schema published by the provider network.

5. The system of claim 4, wherein the route for the one or more resources of the provider network comprises a public IP address prefix.

6. A method comprising:

receiving, at an endpoint router of a provider network that is connected to a client network via a dedicated physical connection between the provider network and the client network, one or more routes for resources of the provider network configured to be provisioned to clients of the provider network as compute resources or storage resources;

determining according to a route tagging schema published by the provider network, based on an origin of the one or more routes and a location of the endpoint router in the provider network, one or more respective corresponding tag field values for the one or more routes; and providing to the client network, via the endpoint router, a routing protocol message, wherein the routing protocol message comprises:

the one or more routes; and the one or more determined respective tag field values indicating one or more respective portions of the provider network where the resources that correspond with the one or more routes are located.

7. The method of claim 6, wherein the one or more routes comprise public IP address prefixes.

8. The method of claim 6, wherein at least one of the one or more portions of the provider network indicated by the one or more respective tag field values is a region of the provider network where the endpoint router of the provider network is located.

9. The method of claim 8, wherein at least one of the one or more portions of the provider network indicated by the one or more respective tag field values is a geographic area where the endpoint router is located, wherein the geographic area comprises the region of the provider network where the endpoint router is located and one or more additional regions of the provider network.

10. The method of claim 6, further comprising:

receiving, via the endpoint router, a routing protocol message from the client network that comprises a set of one or more additional routes for one or more resources of the client network and one or more additional respective tag field values; and propagating the one or more additional routes within the provider network based, at least in part, on the one or more additional respective tag field values.

11. The method of claim 10, wherein at least one of the one or more additional respective tag field values indicates that the client network requests at least one respective route of the one or more additional respective routes to be propagated within a same region of the provider network as a region where the endpoint router of the provider network is located, wherein, for the at least one respective route, said propagating the one or more additional respective routes comprises propagating the at least one route only within the same region of the provider network as where the endpoint router is located.

12. The method of claim 10, wherein at least one of the one or more additional respective tag field values indicates that the client network requests at least one respective route of the one or more additional respective routes be propagated within a same geographic area of the provider network as a particular geographic area where the endpoint router is located, wherein, for the at least one respective route, said propagating the one or more additional respective routes comprises propagating the at least one route within a same region of the provider network in which the endpoint router is located and propagating the at least one route within one or more additional regions of the provider network.

13. The method of claim 10, wherein the provider network stores a client profile for the client network, wherein the set further comprises at least one other route that does not have a corresponding tag field value, wherein, for the at least one other route, said propagating the one or more additional respective routes comprises propagating the at least one other route according to an import policy of the client profile.

14. The method of claim 13, further comprising:

receiving, via the endpoint router, a second routing protocol message from the client network that comprises the at least one other route and a different tag field value that corresponds with the at least one other route; and propagating the at least one other route within a different portion of the provider network based on the different tag field value.

15. A non-transitory computer-accessible storage medium storing program instructions that when executed on one or more processors:

in response to receiving, at a provider network, a routing protocol message from a client network of a client of the provider network, wherein the client network is connected to the provider network via a dedicated physical connection, wherein the routing protocol message comprises one or more routes for resources of the client network and one or more respective tag field values that correspond with the one or more routes:

propagate the one or more routes within the provider network based, at least in part, on the one or more respective tag field values, wherein in response to a given tag field value indicating a particular value in accordance with a route tagging schema published by the provider network, a given corresponding route is propagated within a limited portion of the provider network; and wherein in response to the given tag field value indicating another value in accordance with the route tagging schema, the given corresponding respective route is propagated within a larger portion of the provider network.

16. The non-transitory computer-accessible storage medium of claim 15, wherein the routing protocol message is a border gateway protocol (BGP) update message and wherein the one or more tag field values are one or more BGP community tag field values.

17. The non-transitory computer-accessible storage medium of claim 15, wherein the larger portion of the provider network comprises the limited portion of the provider network.

18. The non-transitory computer-accessible storage medium of claim 15, wherein at least one of the tag field values indicates that a corresponding respective route is to be propagated within a local region of the provider network that includes the dedicated physical connection, wherein at least one other of the tag field values indicates that another corresponding respective route is to be propagated within a larger geographical area of the provider network that includes the local region, and wherein to propagate the one or more routes within the provider network the corresponding respective route is propagated within the local region of the provider network and the other corresponding respective route is propagated within the local region of the provider network and the larger geographic area of the provider network.

19. The non-transitory computer-accessible storage medium of claim 18, wherein, the program instructions when executed on one or more processors:

in response to receiving, at the provider network, an additional routing protocol message from the client network, wherein the additional routing protocol message comprises the route that was propagated within the local region of the provider network and a tag field value that corresponds with the route, wherein the tag field value indicates that the route is to be propagated within the larger geographic area of the provider network:

propagate the route within the provider network throughout the larger geographic area.

20. The non-transitory computer-accessible storage medium of claim 15, wherein the program instructions when executed on one or more processors:

provide, via an endpoint router of the provider network that is connected to the dedicated physical connection, an additional routing protocol message from the provider network to the client network, wherein the additional routing protocol message comprises one or more additional routes for resources of the provider network and one or more additional respective tag field values indicating respective portions of the provider network that correspond with the one or more additional routes;

wherein the one or more additional respective tag field values are formatted according to a route tagging schema published by the provider network.

* * * * *